US012040576B2

(12) United States Patent
Chang et al.

(10) Patent No.: US 12,040,576 B2
(45) Date of Patent: Jul. 16, 2024

(54) CABLE CONNECTOR

(71) Applicant: JESS-LINK PRODUCTS CO., LTD., New Taipei (TW)

(72) Inventors: Hsu-Feng Chang, New Taipei (TW); Chieh-Ming Cheng, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 360 days.

(21) Appl. No.: 17/569,478

(22) Filed: Jan. 5, 2022

(65) Prior Publication Data

US 2023/0253733 A1   Aug. 10, 2023

(30) Foreign Application Priority Data

Nov. 2, 2021   (TW) .................................. 110140718

(51) Int. Cl.
| | |
|---|---|
| *H01R 13/633* | (2006.01) |
| *H01R 13/42* | (2006.01) |
| *H01R 13/502* | (2006.01) |
| *H01R 13/635* | (2006.01) |

(52) U.S. Cl.
CPC ......... *H01R 13/6335* (2013.01); *H01R 13/42* (2013.01); *H01R 13/502* (2013.01); *H01R 13/635* (2013.01)

(58) Field of Classification Search
CPC .. H01R 13/6335; H01R 13/42; H01R 13/502; H01R 13/635
USPC .......................................................... 439/345
See application file for complete search history.

(56) References Cited

U.S. PATENT DOCUMENTS

| | | | | |
|---|---|---|---|---|
| 6,447,170 | B1 * | 9/2002 | Takahashi | G02B 6/3893 |
| | | | | 439/352 |
| 10,444,444 | B2 * | 10/2019 | Ma | G02B 6/3885 |
| 10,578,818 | B1 * | 3/2020 | Chen | G02B 6/4284 |
| 2005/0255736 | A1 * | 11/2005 | Szczesny | H01R 13/6335 |
| | | | | 439/352 |

(Continued)

FOREIGN PATENT DOCUMENTS

| | | | | |
|---|---|---|---|---|
| CN | 102812599 A | * | 12/2012 | B29C 48/10 |
| CN | 107517082 A | * | 12/2017 | H04B 10/07 |

(Continued)

OTHER PUBLICATIONS

Office Action dated Oct. 27, 2022 of the corresponding Taiwan patent application No. 110140718.

*Primary Examiner* — Peter G Leigh

(74) *Attorney, Agent, or Firm* — Chun-Ming Shih; HDLS IPR SERVICES

(57) ABSTRACT

A cable connector includes a shell, a protrusive structure, and an unlocking assembly. The shell has an inserting end and a connecting end. A side plane is formed between the inserting end and the connecting end. The side plane is provided with a sliding trough. The sliding trough has a first plane and a second plane. The protrusive structure is disposed in the sliding trough. The unlocking assembly includes a stem and a flexible arm. The flexible arm includes an arm body and an unlocking portion which contact the first plane and the second plane, respectively. The unlocking portion abuts against the protrusive structure to make the unlocking portion be outward pushed away from the second plane when the stem is being pulled toward an extending direction of the connecting end.

8 Claims, 8 Drawing Sheets

(56) References Cited

U.S. PATENT DOCUMENTS

| | | | |
|---|---|---|---|
| 2015/0093083 A1* | 4/2015 | Tsai | G02B 6/4261 |
| | | | 385/92 |
| 2016/0266340 A1* | 9/2016 | Zhang | G02B 6/4284 |
| 2017/0090128 A1* | 3/2017 | Mori | G02B 6/3881 |
| 2017/0343740 A1* | 11/2017 | Nguyen | G02B 6/4284 |
| 2018/0252871 A1* | 9/2018 | Yeh | G02B 6/4292 |
| 2018/0252880 A1* | 9/2018 | Chung | G02B 6/4292 |
| 2019/0013617 A1* | 1/2019 | Ayzenberg | H01R 13/6582 |
| 2019/0103920 A1* | 4/2019 | Lin | G02B 6/4246 |
| 2019/0187387 A1* | 6/2019 | Wong | G02B 6/3821 |
| 2020/0183106 A1* | 6/2020 | Lun | H01R 13/6275 |
| 2021/0141176 A1* | 5/2021 | Lu | G02B 6/428 |

FOREIGN PATENT DOCUMENTS

| | | | | |
|---|---|---|---|---|
| CN | 108429586 A | * | 8/2018 | ............ H04B 10/40 |
| CN | 109904657 A | | 6/2019 | |
| CN | 111051943 A | * | 4/2020 | ........... G02B 6/4261 |
| TW | M623738 U | | 2/2022 | |
| WO | WO-2011089003 A1 | * | 7/2011 | ............ B29C 48/10 |
| WO | WO-2015190211 A1 | * | 12/2015 | ............ G02B 6/387 |
| WO | WO-2021134582 A1 | * | 7/2021 | ........... G02B 6/3858 |

* cited by examiner

CABLE CONNECTOR

BACKGROUND

Technical Field

The disclosure relates to a connector, particularly to a stem-type cable connector that is easy to be unlocked.

Related Art

With the flourishing development of the electronics industry, a cable connector serves as a connective medium to implement the operations of charge or signal transmission. To meet the requirements of high-speed transmission and compactness of connectors, the industry has to both minimize the sizes of connectors to save the installing space and guarantee the performance of high-speed transmission. Thus, a stem-type cable connector which can reduce volume and operating space appears in the market.

The male head of a common stem-type cable connector is provided with flexible arms on two sides of the shell. When connecting, both the flexible arms and the shell are jointly inserted into the inserting end of the female head, and blocking sheets disposed in the female head will stop the front ends of the flexible arms to lock the male head. When unlocking, the stem is pulled to move the flexible arms backward, and the flexible arms are pushed by a protrusive structure (such as a protrusion or a slope) on the shell to be spread out to escape from the stopping of the blocking sheets. However, the spreading distance of the flexible arm is affected by the height of the protrusive structure. The male head cannot be smoothly inserted into the female head if the height of the protrusive structure is too high, and the front end of the flexible arm cannot be effectively spread out to perform the unlocking function if the height of the protrusive structure is too low.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to significantly increase the outward swing amplitude of the flexible arm to make a user be able to easily unlock and avoid the elastic fatigue for the flexible arm of causing failure to unlock.

To accomplish the above object, the disclosure provides a cable connector which includes a shell, a protrusive structure, and an unlocking assembly. The shell has an inserting end and a connecting end. A side plane is formed between the inserting end and the connecting end. The side plane is provided with a sliding trough. The sliding trough includes a first plane and a second plane. The first plane and the second plane are non-coplanar. The protrusive structure is disposed in the sliding trough. The unlocking assembly includes a stem and a flexible arm. The flexible arm includes an arm body and an unlocking portion. Two ends of the arm body are separately connected with the stem and the unlocking portion. The arm body and the unlocking portion contact the first plane and the second plane, respectively. The unlocking portion abuts against the protrusive structure to make the unlocking portion be outward pushed away from the second plane when the stem is pulled toward an extending direction of the connecting end.

The disclosure further has the following functions. When the stem is released, the paddle is pushed by the elasticity of the elastic member to return to the original position so as to restore the unlocking assembly and make the unlocking portion contact the second plane again. After the guiding section is separated from the protrusive structure through the guide slant, the guiding section may slide to the outside of the shell along the guide slant without being jammed by the height difference (drop). By the positioning sheet of the extending section and the restraint trough of the sliding trough, the positioning sheet is movably limited in the restraint trough to limit the travel of the unlocking assembly.

DETAILED DESCRIPTION

Figure 1:
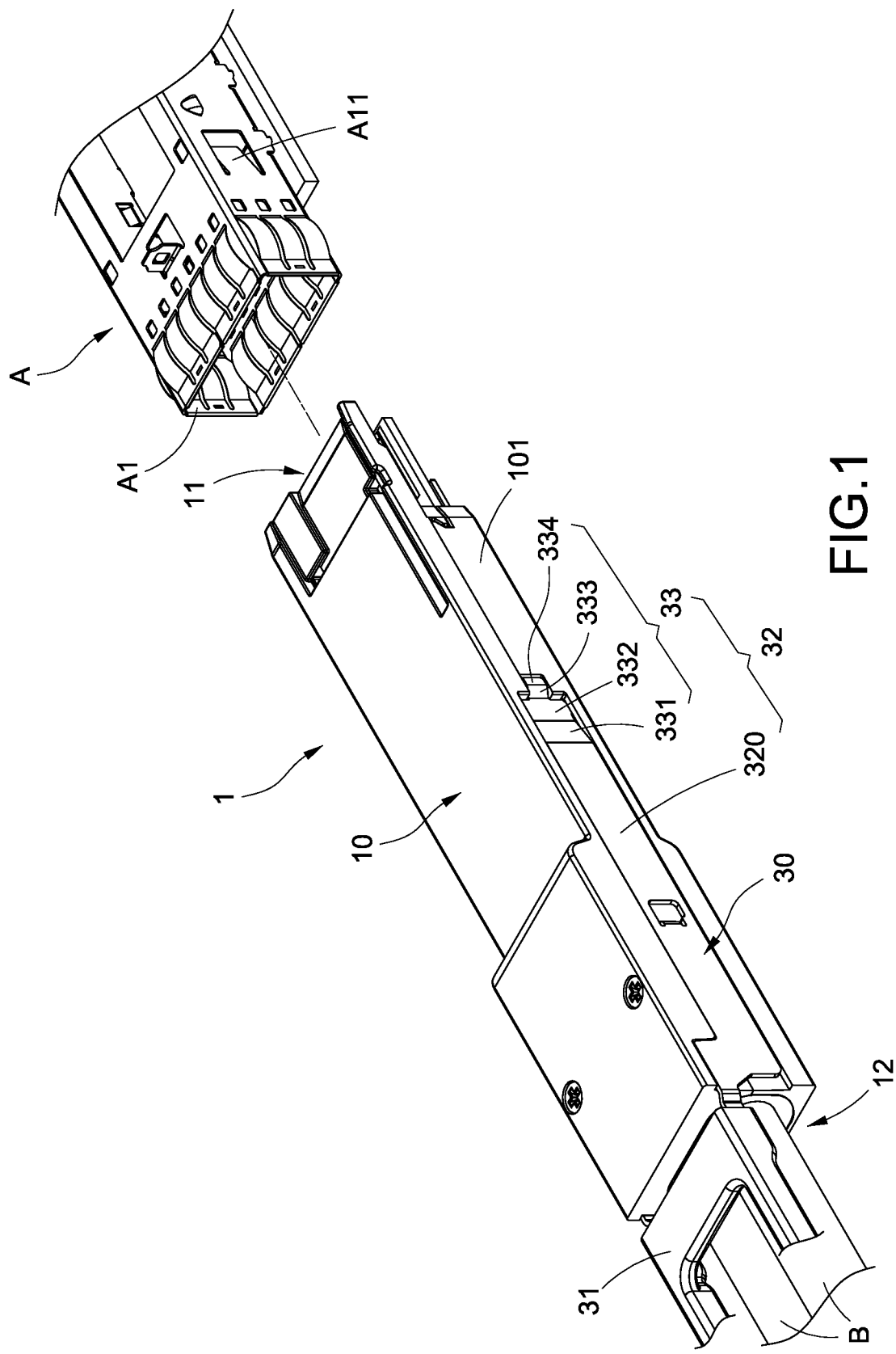
FIG. 1 is an exploded view of the disclosure and a female head of a connector.
Figure 2:
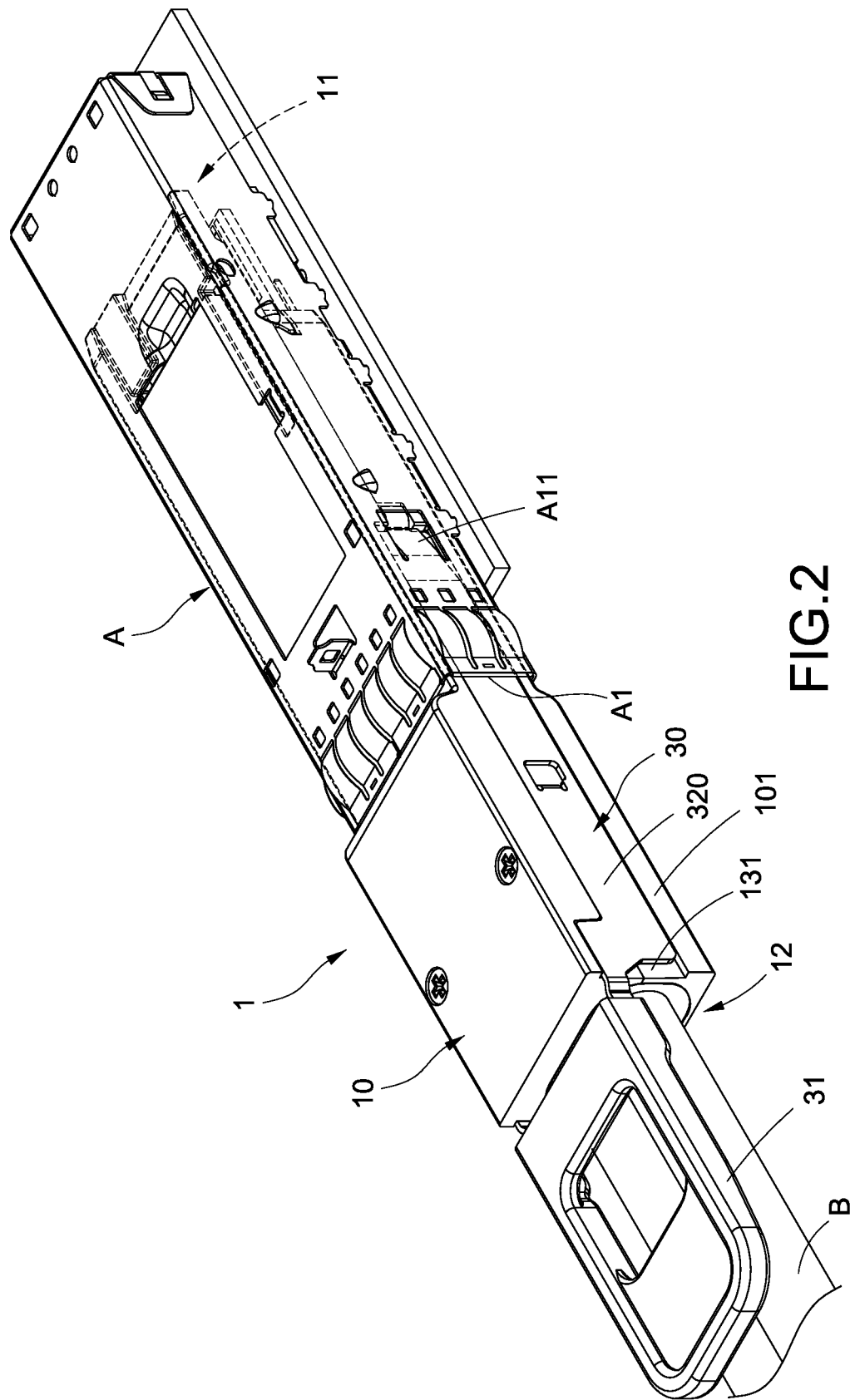
FIG. 2 is an assembled view of the disclosure and a female head of a connector.

The technical contents of this disclosure will become apparent with the detailed description of embodiments accompanied with the illustration of related drawings as follows. It is intended that the embodiments and drawings disclosed herein are to be considered illustrative rather than restrictive.

The disclosure provides a cable connector for connecting with a female head of a connector. In the embodiment, the female head A of connector has an opening A1. Each of two lateral sides of the opening A1 is inward formed with a blocking sheet A11, but not limited to this. Please refer to FIGS. 1-4. The cable connector 1 of the disclosure includes a shell 10, at least one protrusive structure 20 and an unlocking assembly 30.

The shell 10 is of a substantial bar (column) shape and has an inserting end 11 and a connecting end 12 opposite to each other. The inserting end 11 is used to be inserted into the opening A1 of the female head A of connector for connection. The connecting end 12 is used to be penetrated by at least one cable B (such as a fiber optic cable or a copper cable) for electric connection. In the embodiment, two side planes 101 are formed between the inserting end 11 and the connecting end 12 opposite to each other. Each side plane 101 is inward provided with a sliding trough 13. Each sliding trough 13 extends along a longitudinal direction of the shell 10, but not limited to this, for example, the amount of the sliding troughs 13 may be one and is disposed on any one of the two side planes 101. Each sliding trough 13 includes a first plane 131 and a second plane 132. The first plane 131 and the second plane 132 are non-coplanar, that is, a height difference is formed therebetween. A guide slant 14 is formed between the first plane 131 and the second plane 132. In detail, the guide slant 14 is a slope that the height is increased from the second plane 132 to the first plane 131.

In the embodiment, the protrusive structures 20 are two in number and arranged correspondingly to each sliding trough 13, but not limited to this, for example, the amount of the sliding trough 13 and the protrusive trough 20 may also be one, respectively. The protrusive structure 20 is disposed in the sliding trough 13. In the embodiment, the protrusive structure 20 is disposed on the second plane 132 of the sliding trough 13. In the embodiment, the protrusive structure 20 is, but not limited to, a protrusive bump disposed upright. In some embodiments, an outer surface of the protrusive bump of the protrusive structure 20 is of an arcuate shape which may effectively guide the unlocking assembly 30 to slide along the outer surface of the protrusive bump, but not limited to this, for example, slopes may also be formed on two sides of the protrusive bump for guiding.

The unlocking assembly 30 includes a stem 31 and at least one flexible arm 32. The stem 31 is disposed on a side of the connecting end 12 with being capable of longitudinally moving along the shell 10. In the embodiment, the flexible arms 32 are two in number and arranged corresponding to the sliding troughs 13, respectively, but not limited to this, for example, the number of the flexible arm 32, the sliding trough 13 and the protrusive structure 20 may be one, respectively. Each flexible arm 32 includes an arm body 320 and an unlocking portion 33. Two ends of the arm body 320 are separately connected with the stem 31 and the unlocking portion 33. The flexible arms 32 are respectively located on the side planes 101 of two lateral sides of the shell 10 and arranged corresponding to the sliding troughs 13. Each arm body 320 contacts the first plane 131 correspondingly, and each unlocking portion 33 contacts the second plane 132 correspondingly. Each protrusive structure 20 is located between each guide slant 14 and each unlocking portions 33.

Figure 4:
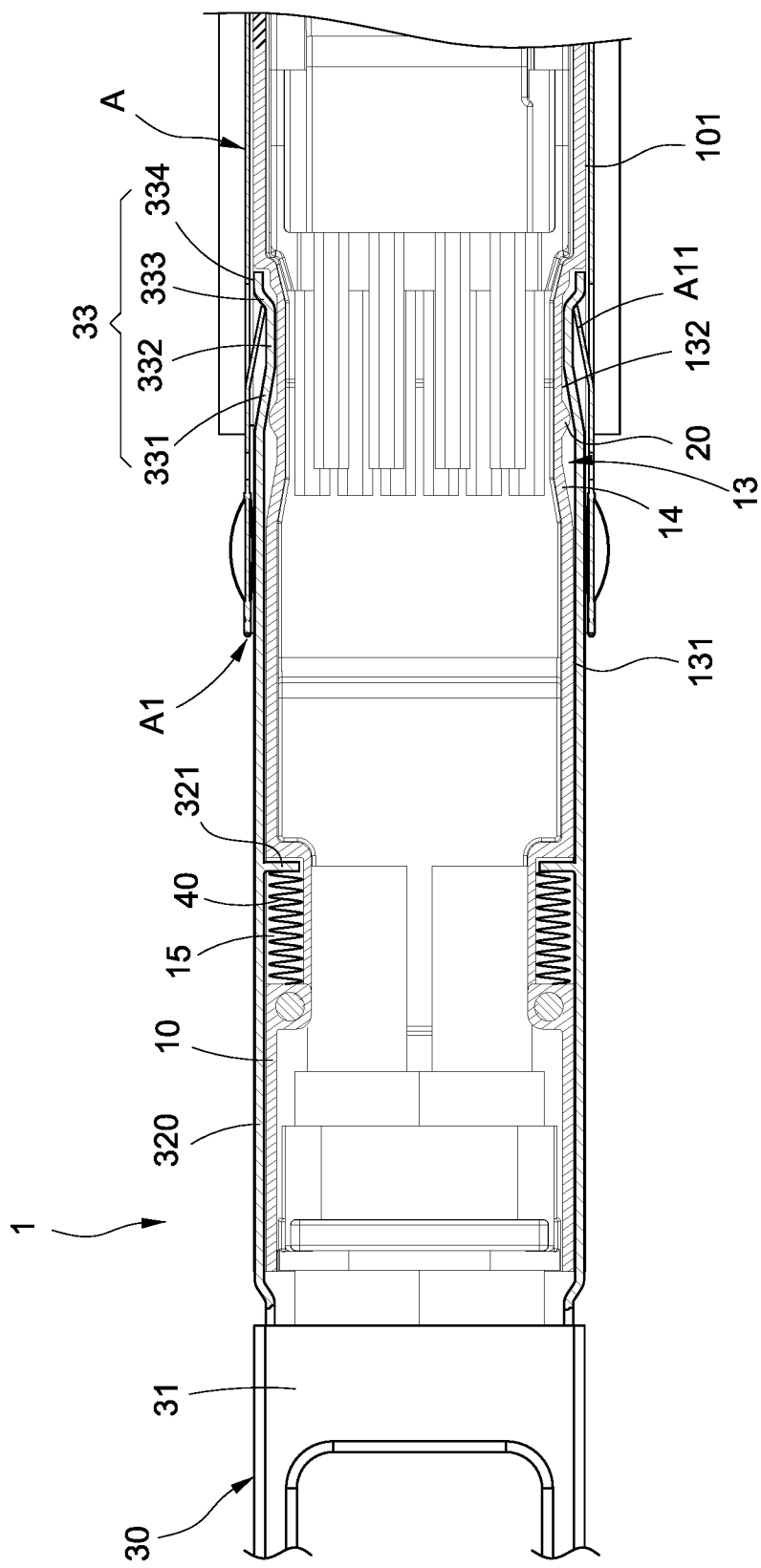
FIG. 4 is a cross-sectional view of the disclosure and a female head of a connector in a using status.
Figure 6:
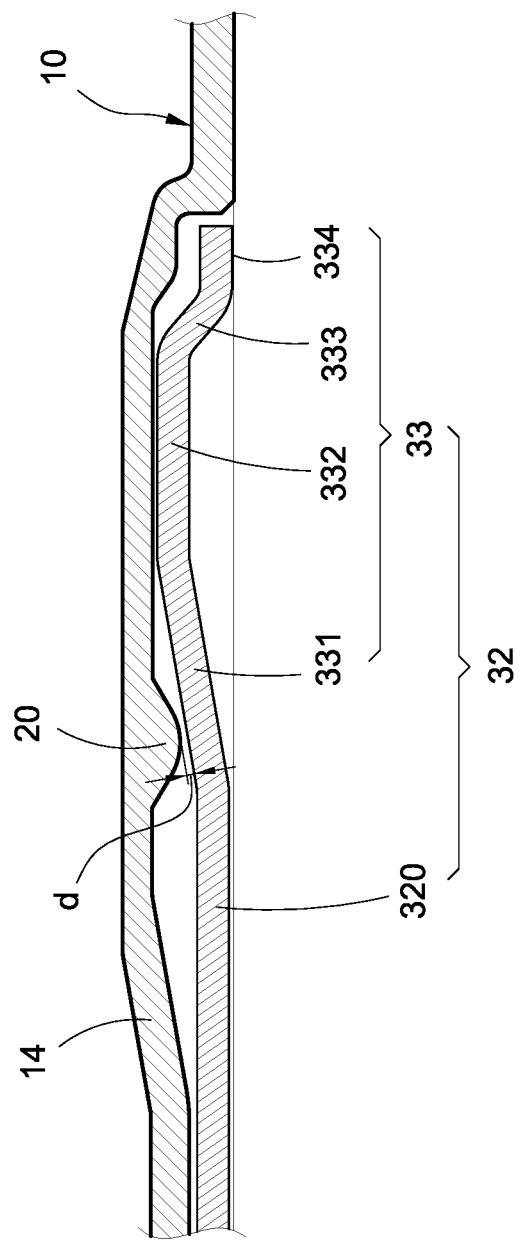
FIG. 6 is a partially enlarged view of FIG. 4.

Further, please refer to FIG. 4, each unlocking portion 33 includes a guiding section 331, an attaching section 332, an extending section 333, and an unlocking plane 334. The guiding section 331, the attaching section 332, the extending section 333, and the unlocking plane 334 of the unlocking portion 33 jointly form a concave shape. In detail, two ends of the guiding section 331 are separately connected with the arm body 320 and the attaching section 332. The guiding section 331 is arranged correspondingly to the protrusive structure 20 and aslant extended toward the second plane 132 to make the attaching section 332 abut against the second plane 132. Also, the protrusive structure 20 is located between the guide slant 14 and the guiding section 311. Please refer to FIG. 6. A gap d is formed between the guiding section 331 of the unlocking portion 33 and a tangent of the protrusive structure 20 so as to make the unlocking assembly 30 be free from contacting the protrusive structure 20 in a stationary state. Please refer back to FIG. 4. The extending section 333 aslant extends from a distal end of the attaching section 332 toward a direction which is away from the second plane 132 to make the unlocking plane 334 located between the side plane 101 and the sliding trough 13 (that is, the unlocking plane 334 does not outward project from the side plane 101). The extending section 333 is arranged correspondingly to the blocking sheet A11 of the female head A of connector to be blocked by the blocking sheet A11 so that the unlocking portion 33 of the flexible arm 32 may not be easily separated.

Figure 3:
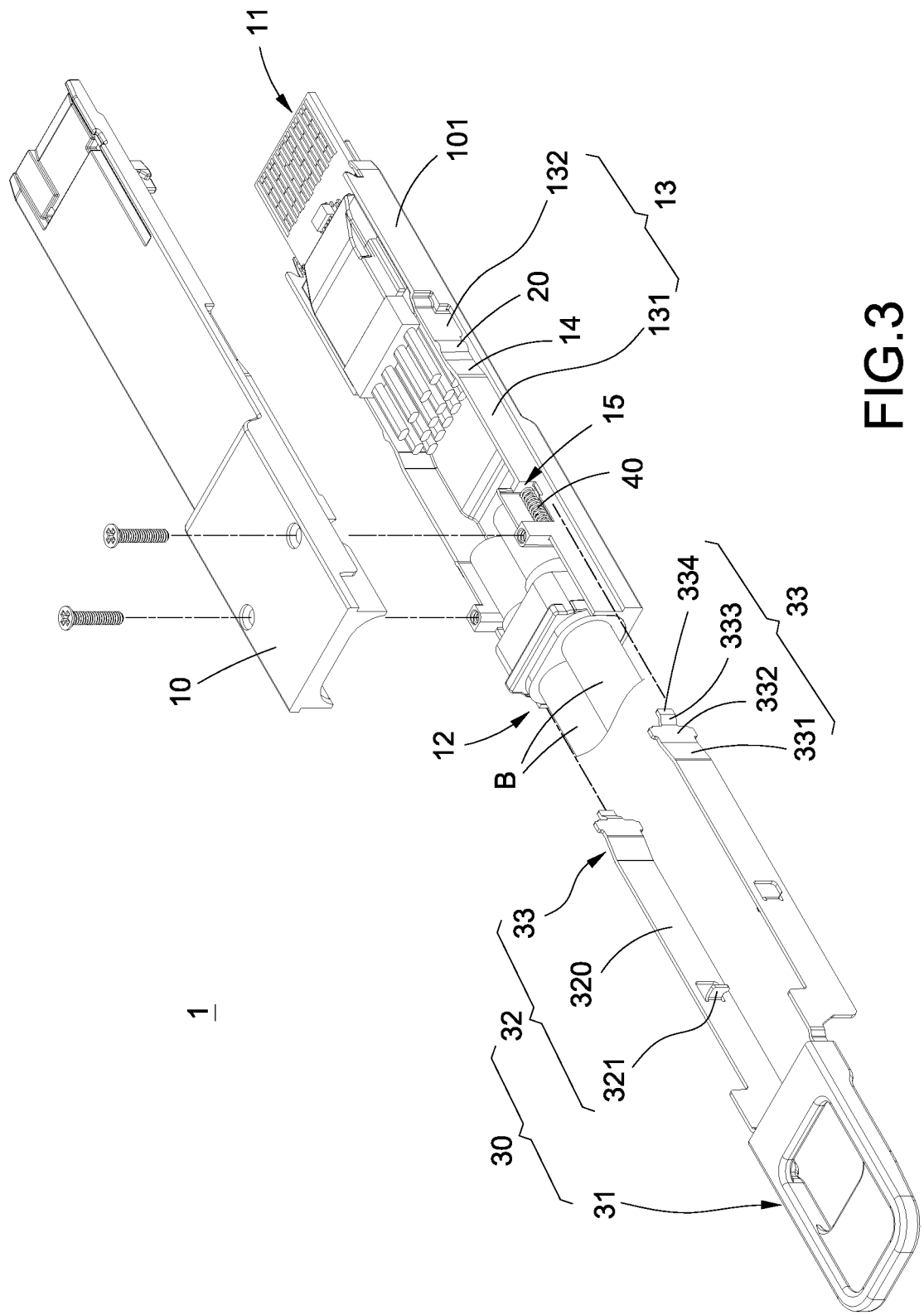
FIG. 3 is an exploded view of the disclosure.

Please refer to FIGS. 3 and 4. The cable connector of the disclosure may further include an elastic member 40. In the embodiment, the elastic member 40 is, but not limited to, two in number. The first plane 131 of each sliding trough 13 is further inward formed with a receiving room 15. Each arm body 320 is provided with a paddle 321 which protrudes toward the shell 10 and is received in the receiving room 15. The elastic member 40 is disposed in the receiving room 15 and an end of the elastic member 40 elastically pushes the paddle 321. In the embodiment, the elastic member 40 is, but not limited to, a compression spring. The paddle 321 pushes the elastic member 40 to make the elastic member 40 be compressed when the stem 31 and the flexible arm 32 are pulled toward an extending direction of the connecting end 12. When the stem 31 is released, the paddle 321 is pushed by the elasticity of the elastic member 40 to return to the original position so as to restore the unlocking assembly 30 and make the unlocking portion 33 of the flexible arm 32 contact the second plane 132 again.

Figure 5:
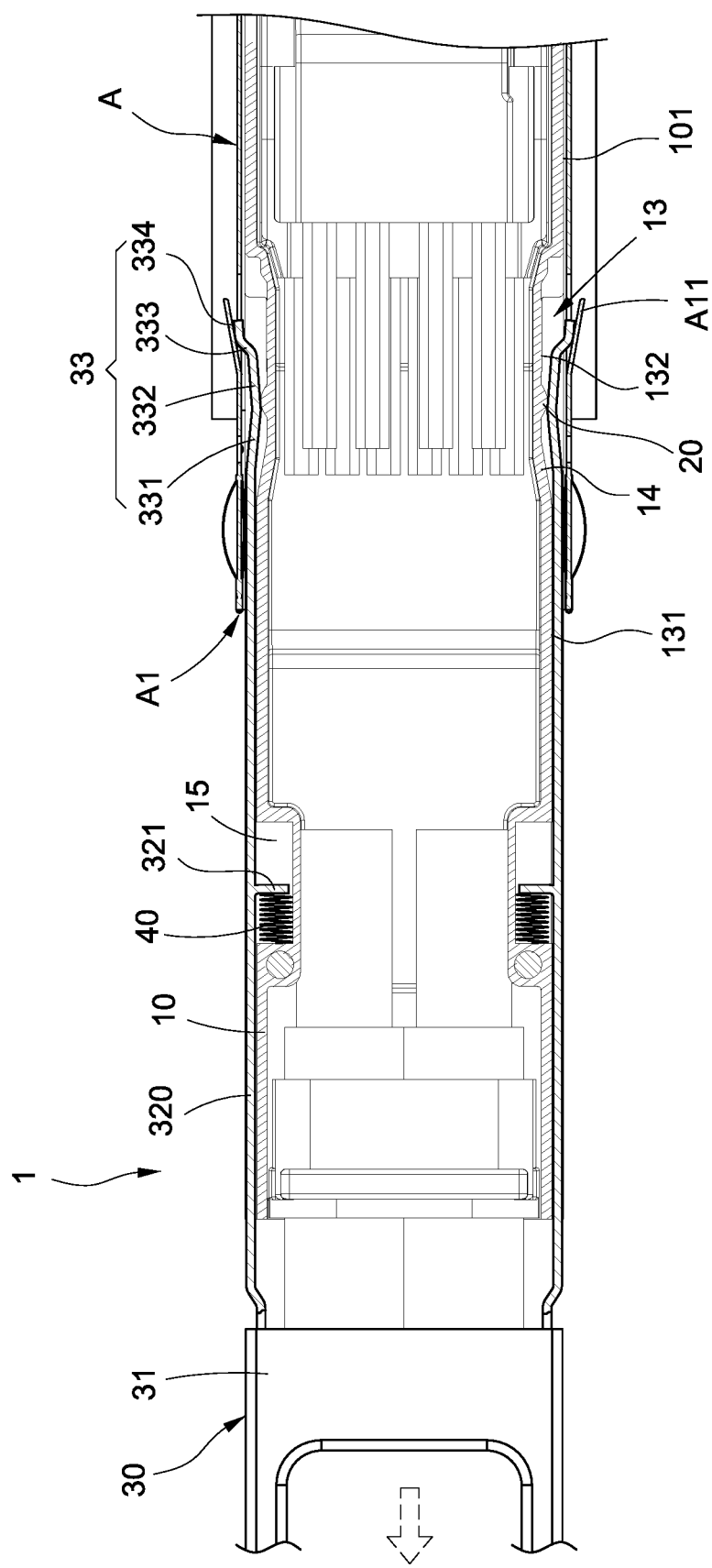
FIG. 5 is another cross-sectional view of the disclosure and a female head of a connector in a using status.

Please refer to FIG. 5, which is a schematic view of the disclosure in an unlocking status. When a user pulls the stem 31 toward an extending direction of the connecting end 12 (that is, toward the left side in the drawing), the stem 31 and the flexible arms 32 move to the left and compress the elastic member 40 through the paddle 321. While the flexible arms 32 are moving leftward, the arm bodies 320 move to the left along corresponding one of the first planes 131 to make the guiding sections 331 of the unlocking portions 33 separately abut against the protrusive structures 20 to outward push the attaching sections 332 away from corresponding one of the second planes 132 and to make each unlocking plane 334 outward protrude from each side plane 101, and to make corresponding one of the blocking sheets A11 move to each unlocking plane 334 along the slope of each extending section 333. After that, the blocking sheets A11 are pushed away from the opening A1 of the female head A of connector to unlock and the cable connector 1 may be withdrawn from the opening A1. It is noted that after the guiding section 331 is separated from the protrusive structure 20, it may slide to the first plane 131 along the guide slant 14 and continuously keep pushing the unlocking portion 33 outward without being jammed by the height difference between the first plane 131 and the second plane 132.

Therefore, because the protrusive structure 20 is disposed on the second plane 132 adjacent to the location of the blocking sheet A11 blocking the extending section 333 and the surface of the protrusive bump of the protrusive structure 20 is of an arcuate shape, the unlocking portion 33 may be significantly pushed away from the shell 10 to obtain desirable effect of unlocking when the unlocking portion 33 is being pushed by the protrusive structure 20 to rise. It is noted that the unlocking portion 33 may be effectively pushed solely through the guide slant 14, but the unlocking portion 33 may not be significantly and instantly pushed away from the second plane 132 to unlock due to the gentle slope of the guide slant 14. Further, the guide slant 14 is far away from the position of the blocking sheet A11, the pushing effect of the unlocking portion 33 may be reduced due to the reason that length and the elastic fatigue of the flexible arm 32 may occur and cause unlocking failure after a long-term use. Thus, the protrusive structure 20 of the cable connector 1 of the disclosure may significantly push away the unlocking portion 33 of the flexible arm 32 instantly when the unlocking portion 33 is being pushed by the protrusive structure 20. This makes a user easily and rapidly to perform unlocking and overcomes the problem of the unlocking failure due to the elastic fatigue of the flexible arm 32 after a long-term use.

Figure 7:
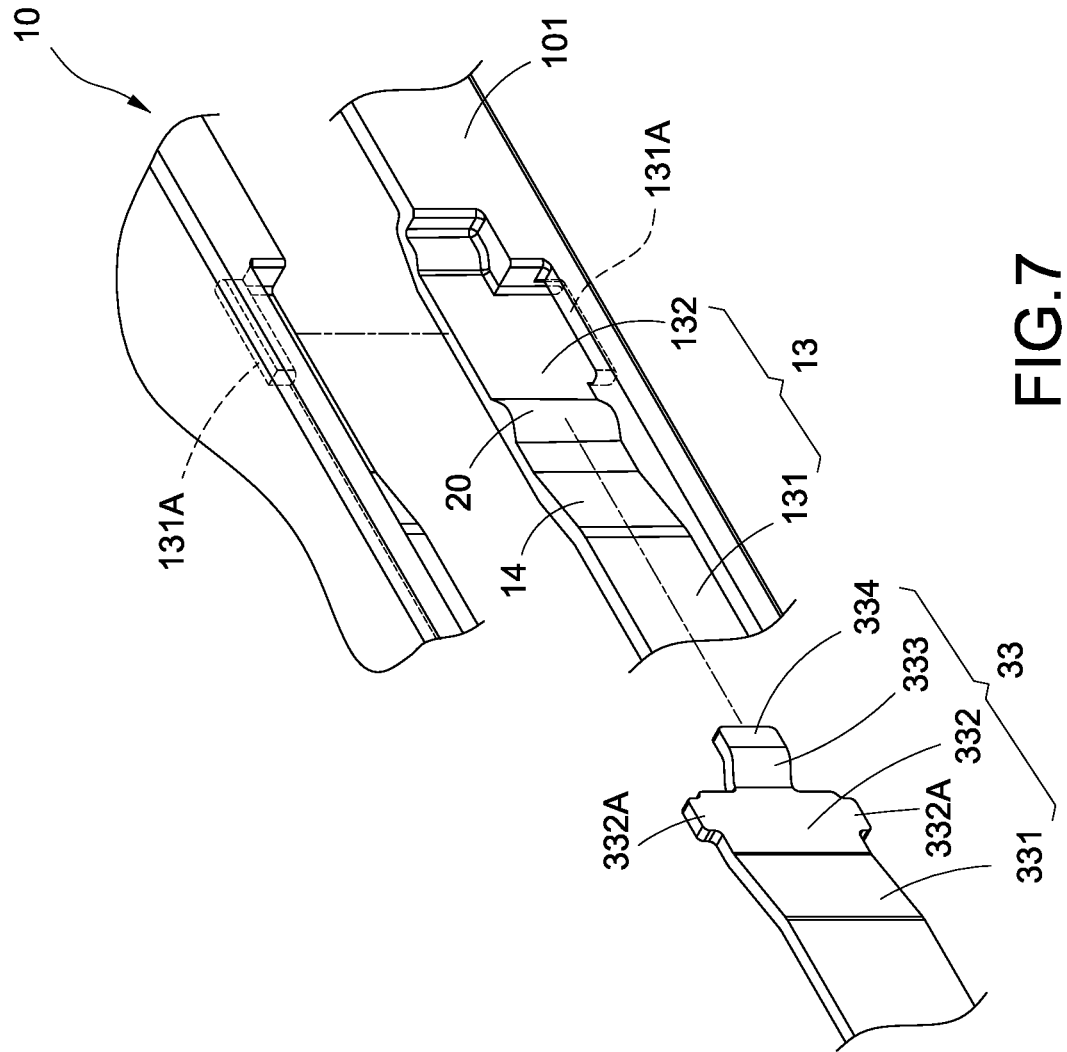
FIG. 7 is a partially exploded view of another embodiment of the disclosure.
Figure 8:
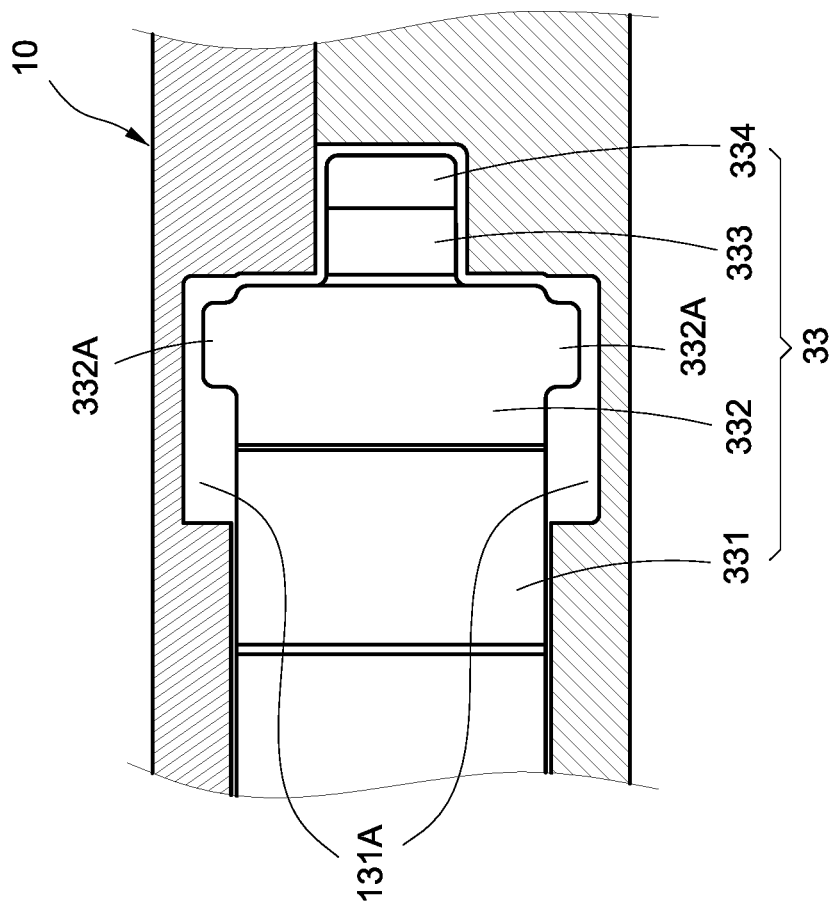
FIG. 8 is a partially cross-sectional view of still another embodiment of the disclosure.

Please refer to FIGS. 7 and 8, which show another embodiment of the disclosure. The primary difference of the embodiment is that a top end and a bottom end of each attaching section 332 are respectively upright extended with a positioning sheet 332A, and a top side and a bottom side of each sliding trough 13 are respectively inward formed with a restraint trough 131A corresponding to each positioning sheet 332A, but not limited to this, for example, the attaching section 332 may be extended with a positioning sheet 332A at either one of the top end and the bottom end of the attaching section 332, and the sliding trough 13 is inward formed with one restraint trough 131A on the corresponding side. The positioning sheet 332A is movably limited in the restraint trough 131A. In detail, when a user pulls the stem 31 toward an extending direction of the connecting end 12, the positioning sheet 332A moves with the unlocking assembly 30 in the restraint trough 131A to limit the travel of the unlocking assembly 30. When the unlocking portion 33 is abutting against the protrusive structure 20 to be pushed away from the second plane 132, the restraint trough 131A may control the travel amplitude of the unlocking portion 33 in a specific range.

While this disclosure has been described by means of specific embodiments, numerous modifications and variations could be made thereto by those skilled in the art without departing from the scope and spirit of this disclosure set forth in the claims.

What is claimed is:

1. A cable connector comprising:
   a shell, comprising an inserting end and a connecting end, a side plane disposed between the inserting end and the connecting end, a sliding trough disposed on the side plane, the sliding trough comprising a first plane and a second plane, the first plane and the second plane being non-coplanar, and a guide slant being disposed between the first plane and the second plane;
   a protrusive structure, disposed on the second plane of the sliding trough; and
   an unlocking assembly, comprising a stem and a flexible arm, the flexible arm comprising an arm body and an unlocking portion, two ends of the arm body separately connected with the stem and the unlocking portion, the arm body contacting the first plane and the unlocking portion contacting the second plane, the unlocking portion comprising a guiding section connected with the arm body, wherein the protrusive structure is located between the guide slant and the guiding section;
   wherein the guiding section of the unlocking portion abuts against the protrusive structure to make the unlocking portion be pushed away from the second plane when the stem is being pulled toward an extending direction of the connecting end.

2. The cable connector according to claim 1, wherein the unlocking portion comprises an unlocking plane located between the side plane and the sliding trough when the stem is stationary, and the unlocking portion abuts against the protrusive structure to make the unlocking portion be outward pushed away from the second plane and make the unlocking plane protrude from the side plane when the stem is being pulled toward the extending direction of the connecting end.

3. The cable connector according to claim 1, further comprising an elastic member, wherein the first plane is disposed with a receiving room, the arm body comprises a paddle disposed protrusively, the elastic member is received in the receiving room, and an end of the elastic member elastically pushes the paddle.

4. The cable connector of claim 3, wherein the paddle compresses the elastic member when the stem is being pulled toward the extending direction of the connecting end.

5. The cable connector of claim 4, wherein the elastic member pushes the paddle to restore the unlocking assembly and make the unlocking portion contact the second plane when the stem is being released.

6. The cable connector of claim 1, wherein a gap is defined between the unlocking portion and the protrusive structure when the stem is stationary.

7. The cable connector of claim 1, wherein the unlocking portion comprises an attaching section, the attaching section is upright extended with at least one positioning sheet, at least one side of the sliding trough is disposed with a restraint trough corresponding to the positioning sheet, and the positioning sheet is movably limited in the restraint trough.

8. The cable connector of claim 1, wherein an outer surface of the protrusive structure is of an arcuate shape.

* * * * *